(12) United States Patent
Klein et al.

(10) Patent No.: US 7,732,040 B2
(45) Date of Patent: Jun. 8, 2010

(54) PATTERNED CLEANING CARD AND METHOD OF MANUFACTURING SAME

(75) Inventors: Peter Klein, North Yarmouth (DE); Glen Alan Bailey, Minot, ME (US); Stephen Anthony Bouchard, Auburn, ME (US)

(73) Assignee: Enefco International, Inc., Auburn, ME (US)

( * ) Notice: Subject to any disclaimer, the term of this patent is extended or adjusted under 35 U.S.C. 154(b) by 0 days.

(21) Appl. No.: 10/857,382

(22) Filed: May 28, 2004

(65) Prior Publication Data

US 2005/0266211 A1 Dec. 1, 2005

(51) Int. Cl.
B32B 3/28 (2006.01)
(52) U.S. Cl. .............. 428/179; 428/174; 15/210.1; 15/256.51
(58) Field of Classification Search ............ 428/174, 428/179, 181; 15/229.12, 210.1, 256.51; 399/327
See application file for complete search history.

(56) References Cited

U.S. PATENT DOCUMENTS

| | | | |
|---|---|---|---|
| 4,357,615 A | 11/1982 | Yoshiharu et al. | |
| 5,030,500 A * | 7/1991 | Perdelwitz et al. | 428/137 |
| 5,153,964 A * | 10/1992 | Gelardi et al. | 15/229.12 |
| 5,366,785 A * | 11/1994 | Sawdai | 428/156 |
| 5,525,417 A | 6/1996 | Eyler | |
| 5,824,611 A | 10/1998 | Eyler | |
| 5,832,556 A | 11/1998 | Eyler | |
| 5,878,458 A | 3/1999 | Higginbotham | |
| D420,658 S | 2/2000 | Eyler | |
| 6,107,221 A | 8/2000 | Nakajima | |
| 6,156,407 A | 12/2000 | Neubauer et al. | |
| 6,210,490 B1 | 4/2001 | Michael et al. | |
| 6,243,908 B1 | 6/2001 | Battle et al. | |
| 6,353,233 B1 | 3/2002 | Kikuchi et al. | |
| 6,611,985 B1 | 9/2003 | Neubauer et al. | |

FOREIGN PATENT DOCUMENTS

EP 0944029 B1 3/2003
WO 01/15146 A1 1/2001

* cited by examiner

Primary Examiner—Alicia Chevalier
(74) Attorney, Agent, or Firm—Caesar, Rivise, Bernstein, Cohen & Pokotilow, Ltd.

(57) ABSTRACT

A machine-actuating mechanism cleaning card includes a substrate having a central plane between opposed surfaces, a machine direction dimension between opposed end edges and a transverse direction dimension between opposed side edges. The opposed surfaces each have a plurality of discrete raised areas arranged in transversely extending rows. At least some of the discrete raised areas in at least some of the transversely extending rows extend outwardly on each side of the central plane. The discrete raised areas each include a peak and a peripheral wall joined at one edge to the peak and having an opposed edge that is closer to the central plane than the peak. The cleaning substrate has an effective thickness that is greater than the nominal thickness. Methods of making cleaning cards also are part of the invention.

32 Claims, 4 Drawing Sheets

PATTERNED CLEANING CARD AND METHOD OF MANUFACTURING SAME

FIELD OF THE INVENTION

This invention relates generally to cleaning cards and more specifically to cleaning cards having the capability of cleaning internal surfaces of machine-actuating mechanisms such as reading mechanisms in ATM machines, vending machines including slots for receiving paper currency, turnstile machines including slots for receiving a token or card including a magnetic stripe, and a variety of other machines including reading mechanisms having internal surfaces that require cleaning.

BACKGROUND ART

Many machines have machine-actuating mechanisms of the type intended to receive an operating card or other machine-operating substrate (e.g., paper currency) for actuating the operation of a machine. In many machines, internal surfaces of the machine-actuating mechanism are spaced apart a distance greater than the permissible thickness of the operating card, to thereby keep the operating card out of contact with those internal surfaces, particularly internal surfaces of sensing mechanism, e.g., surfaces of magnetic sensors, optical lenses and other surfaces defining the internal cavity of the machine actuating mechanism. In many of these machine-actuating mechanisms internal rails are provided to actually support the operating card in a position out of contact with the sensing mechanisms.

Cleaning cards for use in cleaning machine-actuating mechanisms are well known in the art. The commercially available cleaning cards are substantially flat substrates that are intended to closely approximate the dimensions of the machine-operating substrate so that they can be received in the machine-actuating mechanism for the purpose of cleaning internal surfaces thereof. However, if the maximum thickness of a cleaning card that can be accepted in a reading device of a machine is less than the spacing of the internal surfaces to be cleaned, then the cleaning card will not effectively engage those surfaces and will not provide its desired cleaning function. This is particularly troublesome in reading devices wherein the operating card and cleaning card are inserted through a slot into an enclosed machine-actuating mechanism and actually are pulled into, and retained within the enclosed mechanism during the operation and cleaning of the reading device, respectively. In these reading devices, the cleaning card cannot be manually pressed against either of the opposed internal surfaces within the slot, since the user of the cleaning card actually relinquishes control over the position of the cleaning card when it is pulled into the enclosed mechanism.

Cleaning cards having raised surfaces for cleaning or removing foreign objects from internal machine surfaces are known in the prior art, as exemplified by the disclosures in U.S. Pat. No. 6,243,908 (Battle et al.), U.S. Pat. No. 6,107,221 (Nakajima et al.) and U.S. Pat. No. 5,153,964 (Gelardi et al.).

The Battle et al. '908 patent discloses a track clearance card employing a series of tabs which are biased in opposite directions and have free, distal ends. While this type of card structure may be suitable for use in cleaning tracks in certain types of document handling systems, it is not well suited for use in cleaning machine-actuating mechanisms; particularly, machine-actuating mechanisms wherein the cleaning operation requires the cleaning card to move in opposed linear directions during the cleaning operation.

The Nakajima et al. '221 patent discloses a variety of cleaning card structures. The embodiment illustrated in FIGS. 5A-5C includes two curved portions protruding in opposite directions from the central axis of the card and extending continuously from one side edge to the other side edge of said card. This structure has limited applicability, since it is unable to clean protected, internal surfaces of a machine-actuating mechanism that are recessed below protective guard rails of the mechanism. In particular, such protective guard rails will compress the curved portions and thereby prevent those curved portions from engaging the desired internal surfaces to be cleaned.

The Gelardi et al. '964 patent discloses a number of embodiments of a cleaning card, with the preferred embodiments illustrated in the drawings including a stiff backing sheet and a flexible cleaning sheet adhered to selected regions of the backing sheet. The '964 patent states, in the paragraph beginning on line 47 of column 2, that the cleaner can be a single sheet with flaps folded in both directions. In all embodiments described in detail in the drawings the flaps are disposed in rows extending from one side edge to the other side edge. In some of these latter embodiments each row is provided by a single continuous flap. In other embodiments, each row is provided by a continuous flap that is interrupted along its transverse dimension from one side edge to the other side edge by a series of spaced apart cuts. In yet other embodiments of the invention each row of flaps is provided by a series of discrete, spaced-apart tabs having free edges projecting above the general plane of the card. In all of the aforementioned embodiments the flaps in each row all project in the same direction from the central plane of the card. Providing flaps in each row that extend only in a single direction imposes limitations on the cleaning effectiveness of the cards. In addition, providing rows of flaps in the form of spaced apart tabs having free edges imposes limitations on the use of the card, and is not a desirable construction for cleaning cards that are intended to be moved in opposed longitudinal directions during a cleaning operation.

The present invention provides a unique, very versatile solution to the problem of cleaning internal surfaces of a machine-actuating mechanism, and in particular internal surfaces of a sensing mechanism that are spaced further apart from each other more than the maximum thickness of a substrate that can be received within the mechanism. In addition, as will be noted hereinafter, the present invention can be employed in virtually all environments in which conventional cleaning cards have been employed in the past, even in reading devices wherein the prior art cleaning cards actually engage internal surfaces of a sensing mechanism to provide effective cleaning of those surfaces.

SUMMARY OF THE INVENTION

The above and other objects of this invention are achieved in cleaning card structures designed for use in cleaning internal surfaces of a machine-actuating mechanism (e.g., internal surfaces of a sensing mechanism) of the type intended to receive an operating card or other machine-operating substrate for actuating the operation of a machine. The cleaning cards of this invention include a substrate having a central plane between opposed surfaces thereof, a machine direction dimension defined between opposed end edges and a transverse direction dimension defined between opposed side edges. The opposed surfaces each have a plurality of discrete raised areas each having an apex, or peak, and a peripheral wall having an edge remote from said apex, or peak, said discrete raised areas being disposed in a plurality of transversely extending rows. At least some discrete raised areas in at least some of the transversely extending rows, and preferably in all of said rows, extend on each side of the central plane of the substrate with the peaks of the raised areas spaced farther from the central plane of the substrate than the edges of the peripheral wall that are remote from the peaks. The cleaning card substrate has an effective thickness between the opposed surfaces that is greater than the nominal thicknesses between those surfaces.

Reference throughout this application to "effective thickness" means the thickness dimension between planes that are parallel to each other and are tangent to the highest points (e.g., peaks) on opposite sides of the central plane.

Reference throughout this application to "nominal thickness" means the thickness of the actual substrate normal to, and between the opposed surfaces of the substrate.

Reference throughout this application to "apex," "peak," "apices" or "peaks" refers to the highest location of the discrete raised areas, which unless specifically limited, can be a flat surface, the upper region of a curved surface, a linear edge, or a point.

Reference throughout this application to "peripheral wall" in referring to a portion of a discrete raised area means both a continuous wall extending about the peak, or apex, of a discrete raised area, as well as an interrupted peripheral wall having two or more spaced-apart segments about the apex of a discrete raised area. In particular, reference to "peripheral wall" in this application is a generic term encompassing, inter alia, the peripheral wall structure in all embodiments specifically described and shown in FIGS. 1-9.

Reference in this application to discrete raised areas being "disposed" in any specified direction does not require that the discrete raised areas be actually spaced apart from each other by substantially flat, non-raised surfaces. In other words, the reference to "disposed" in describing the positional relationship between, or among discrete raised areas describes an arrangement wherein adjacent discrete raised areas include peripheral wall edges remote from the apices of said adjacent discrete raised areas, which edges either are in contact with each other or are spaced apart from each other by undeformed regions of the cleaning card substrate.

Most preferably every other raised area in each transverse row is on one side of the central plane of the substrate and the other raised areas in each transverse row are on the other side of the central plane of the substrate.

Most preferably the effective thickness of the cleaning card is more than three times its nominal thickness.

In the preferred embodiments of this invention at least some of the discrete raised areas on each side of the central plane, and most preferably all of said discrete raised areas, have complimentary, underlying recessed areas.

In certain embodiments, transverse rows of discrete raised areas are separated in the machine direction by generally planar sections of the substrate that are free of raised areas, the nominal thickness of the cleaning card substrate being substantially the same in the spaced apart raised areas and in the generally planar sections between said raised areas.

In certain preferred embodiments of this invention at least some of the raised areas have side margins extending in the machine direction that are separated from the cleaning card substrate; most preferably by cuts.

In the most preferred embodiments of this invention the raised areas in at least one of the transversely extending rows are transversely offset from raised areas in an adjacent transversely extending row so that a surface of at least the peripheral wall of at least one raised area in said adjacent rows on each side of said central plane is located in the machine direction along the entire transverse dimension of the substrate.

In the most preferred embodiments substantially all of the discrete raised areas have a peak and a peripheral wall terminating at a peripheral edge remote from said peak and being disposed closer to the central plane of said substrate than said peak, said cleaning card substrate having an effective thickness between the opposed surfaces that is greater than the nominal thickness between those surfaces.

In certain preferred embodiments the discrete raised areas extend over substantially the entire surface of each of the opposed surfaces.

In one embodiment of the invention the discrete raised areas extend over substantially the entire length, from one end edge to the other end edge, but extend over approximately one-half of the transverse dimension of the substrate from one side edge of said substrate to approximately the central longitudinal axis of the substrate.

In certain embodiments of this invention the cleaning card substrate includes a first set of discrete spaced-apart raised areas located in at least two transverse rows disposed relative to each other in the machine direction and being located adjacent one end edge of said substrate, and a second set of discrete spaced-apart raised areas located in at least two transverse rows disposed relative to each other in the machine direction adjacent the opposed end edge. In this embodiment a central region of the card is substantially planar and free of raised areas.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
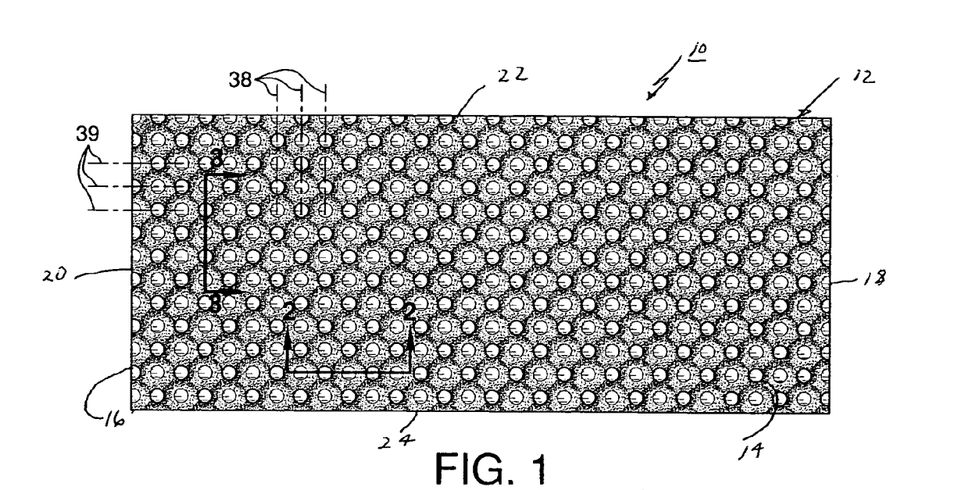
FIG. 1 is a plan view of one embodiment of the invention.
Figure 2:
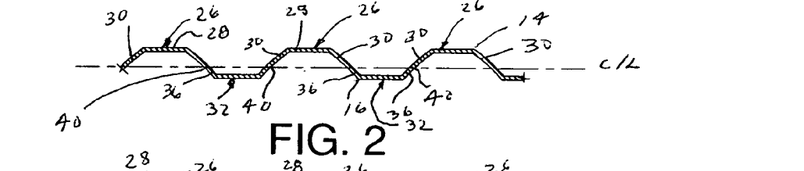
FIG. 2 is a sectional view along line 2-2 of FIG. 1, showing the central plane by line C/L.
Figure 3:
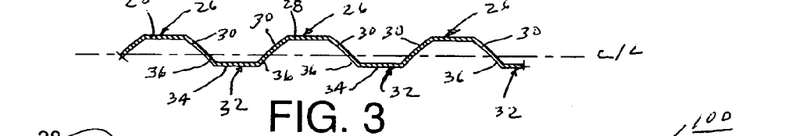
FIG. 3 is a sectional view along line 3-3 of FIG. 1, showing the central plane by line C/L.

A cleaning card in accordance with one embodiment of this invention is illustrated at 10 in FIGS. 1-3. This cleaning card includes a substrate 12 having a central plane C/L between opposed surfaces 14 and 16. In addition, the substrate 12 has a machine direction dimension disposed between opposed end edges 18 and 20, and a transverse direction dimension disposed between opposed side edges 22 and 24.

Referring to FIGS. 2 and 3, the substrate 12 includes discrete raised areas 26 on one side of the central plane C/L, each having a peak or apex 28 joined to a sloping peripheral wall 30. In addition the substrate includes a plurality of discrete raised areas 32 on the other side of the central plane C/L including a peak or apex 34 joined to a sloping peripheral wall 36. The discrete raised areas 26 and 32 preferably are formed by an embossing operation and are disposed in both the transverse direction (FIG. 3) and machine direction (FIG. 2) to provide a plurality of transversely extending rows 38 of raised areas, which rows are disposed relative to each other in the machine direction. Although in the preferred embodiments the transversely extending rows 38 are substantially normal to the opposed side edges 22 and 24, it is within the scope of this invention to orient the transversely extending rows so that they are canted at an angle other than 90 degrees to such opposed side edges.

Referring specifically to FIG. 2, which shows a segment of a longitudinal row 39 of discrete raised areas, it should be noted that the sloping peripheral wall 30 of each discrete raised area 26 joins the sloping peripheral wall 36 of an adjacent discrete raised area 32 at a peripheral edge 40 located substantially at the central plane C/L of the substrate 12. This peripheral edge 40 provides the leading edge of one of the discrete raised areas 26 or 32, and the trailing edge of its connected raised area 32 and 26, respectively, as viewed in the machine direction of the substrate 12 (e.g., along line 2-2 of FIG. 1). Although in the preferred embodiments the longitudinal rows 39 are substantially normal to the opposed end edges 18 and 20, it is within the scope of this invention to orient the longitudinal extending rows so that they are canted at an angle other than 90 degrees to such opposed end edges.

Referring to FIGS. 1 and 3, it should be noted that the discrete raised areas 26, 32 in each of the transverse rows 38 are discrete raised areas 26 located on one side of the central plane alternating with discrete raised areas 32 located on the other side of the central plane. This same relationship exists in longitudinal rows 39 of discrete raised areas extending in the machine-direction dimension. As illustrated in FIGS. 1 and 3, each discrete raised area 26, 32 disposed in each transverse row 38 is in transverse alignment with a raised area 32, 26, respectively, in an adjacent transverse row 38. However, it is within the scope of this invention to transversely offset the discrete raised areas in adjacent transverse rows by any desired distance, such that the discrete raised areas 26 and 32 in one transverse row 38 only partially overlap the discrete raised areas 32, 26, respectively, in an adjacent transverse row 38. In this latter embodiment, the apices of discrete raised areas in one longitudinal row can be solely apices 28 of discrete raised areas 26 or apices 34 of discrete raised areas 32, and the apices of discrete raised areas in an adjacent, longitudinal row may be provided solely by apices 34 of discrete raised areas 32 or apices 28 of discrete raised area 26, respectively. By transversely offsetting the raised areas 26 and 32 in adjacent transverse rows 38, peaks 28 of the discrete raised areas 26 will be present over a greater percentage of the transverse dimension of the cleaning card 10 for cleaning internal surfaces of a machine-actuating mechanism when the cleaning card is directed into the machine-actuating mechanism in the machine direction. Likewise, the peaks 34 of discrete raised area 32 will be present over a greater percentage of the transverse dimension of the cleaning card 10 when the cleaning card is employed to clean internal surfaces of a machine-actuating mechanism, as just described.

Figure 4:
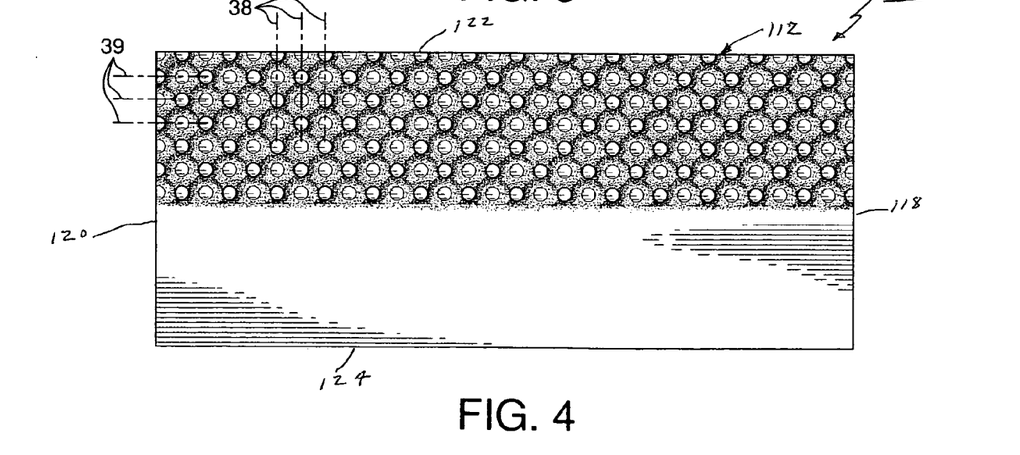
FIG. 4 is a plan view of an alternate embodiment of the invention.

Referring to FIG. 4, a second embodiment of a cleaning card is illustrated at 100. This cleaning card has a substrate 112 that can be formed of the identical materials as substrate 12, as will be described in detail later in this application. In addition, the cleaning card 100 has substantially the same pattern, or arrangement, of discrete raised areas 26 and discrete raised areas 32 as the cleaning card 10 illustrated in FIGS. 1 and 2, with the exception that the embossed pattern of raised areas is provided only over one half of the transverse dimension of the substrate 112. Thus, in this embodiment of the invention one half of the substrate 112 (the lower half indicated in FIG. 4) is substantially planar and unembossed. The other half of the substrate 112 has a plurality of transverse rows 38 of raised areas 26 and 32, arranged in the identical manner described above in connection with the cleaning card 10 illustrated in FIGS. 1-3. Moreover, the discrete raised areas 26 and 32 in adjacent transverse rows 38 can be transversely offset from each other, also as was described in detail in connection with the cleaning card 10 illustrated in FIGS. 1-3 to achieve the same or similar benefit as described with respect to the cleaning card 10. In addition, the transverse rows 38 and longitudinal rows 39 of raised areas either can be normal to opposed side edges 122, 124 or opposed end edges 118, 120, respectively, or can be canted at a different angle relative to said side and end edges, as described in connection with cleaning card 10.

The cleaning card 100 provides at least two options in use, and may be well suited for use in environments in which a cleaning card is continuously gripped by a user as it is being swiped through a machine-actuating mechanism to clean internal surfaces thereof. For example, in a number of ATM machines the machine-actuating mechanism does not actually pull or suck the operating card (or cleaning card) into an internal cavity. Rather, the operating card is actually swiped through an open-ended slot, with the user of the card maintaining a continuous grip on the operating card during use. In these latter mechanisms the cleaning card 100 of FIG. 4 can be employed by a user either gripping the embossed half of the cleaning card 100 and swiping the substantially planar half through the machine-actuating mechanism, or alternatively, the user can grip the planar half of the cleaning card 100 and swipe the embossed half through the cleaning mechanism.

Figure 5:
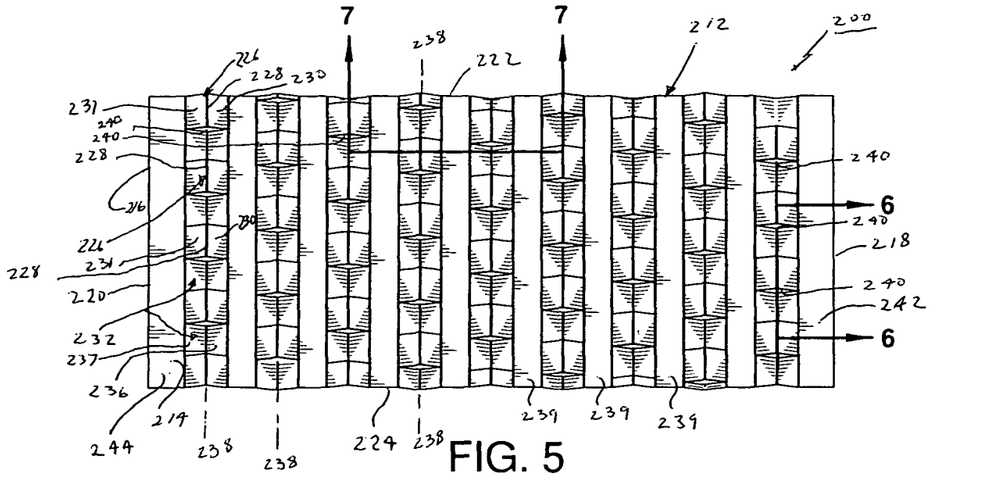
FIG. 5 is a plan view of yet another embodiment of the invention.
Figure 6:
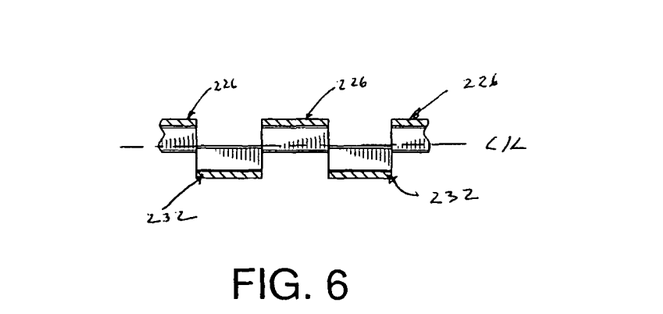
FIG. 6 is a sectional view taken along line 6-6 of FIG. 5, with the central plane being designated C/L.
Figure 7:
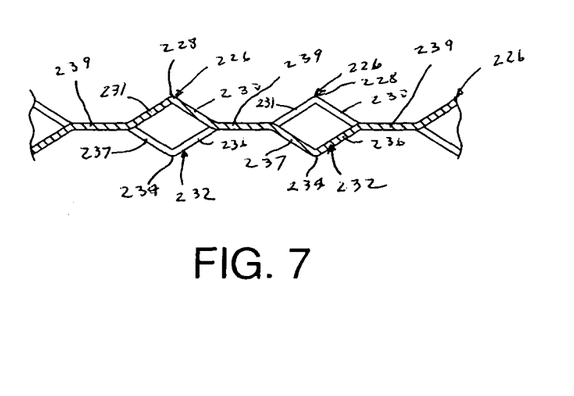
FIG. 7 is a sectional view taken along line 7-7 of FIG. 5; with the central plane being designated C/L.

Referring to FIGS. 5-7, a most preferred embodiment of a cleaning card in accordance with this invention is illustrated at 200. The cleaning card 200 includes a substrate 212, which can be of the identical materials employed in the substrate 12, 112 of the cleaning cards 10 and 100, as will be described in detail later in this application. The substrate 212, includes opposed surfaces 214, 216 on opposite side of central plane C/L, opposed end edges 218, 220 defining the machine direction dimension of the cleaning card 200, and opposed side edges 222, 224 defining the transverse direction dimension of the cleaning card 200.

The substrate 212 includes discrete raised areas 226 on one side of the central plane C/L, each of said raised areas including a peak 228 joined to a sloping peripheral wall including segments 230, 231. In addition, the substrate 212 includes discrete raised areas 232 extending on the other side of the central plane C/L, each of said latter discrete raised areas including a peak 234 and a sloping peripheral wall including segments 236, 237.

As can be seen best in FIG. 5, the discrete raised areas 226 and 232 are disposed in both the transverse direction and the machine direction of the substrate 212 so as to dispose those discrete raised areas in a plurality of transversely extending rows 238 that are spaced apart from each other in the machine direction dimension. As can be seen best in FIG. 7, each of the transverse rows 238 is spaced apart from an adjacent transverse row by a substantially planar segment 239. As in the above-described embodiments, the transverse rows 238 of raised areas either can be normal to opposed side edges 222, 224, as illustrated, or canted at a different angle to said side edges as desired.

Referring specifically to FIGS. 5 and 6, each of the transversely extending rows 238 is provided by a series of alternating discrete raised areas 226 and discrete raised areas 232.

Referring to FIG. 5, in the preferred embodiment of the invention, the adjacent discrete raised areas 226 and 232, are separated from each other by slits, or cuts 240 to provide open areas for entrapping debris during the cleaning of a machine-actuating mechanism. As is further illustrated in FIG. 5, in a preferred embodiment of this invention the discrete raised areas in adjacent rows 238 are transversely offset relative to each other so that the cut regions or slots 240 in each transverse row are transversely offset from the cut regions, or slots 240 in each adjacent transverse row. In this construction, internal surfaces of the machine-actuating mechanism to be cleaned will be exposed to solid surfaces of discrete raised areas 226 over the entire transverse extent of the substrate 212, and also to solid surfaces of discrete raised areas 232 over the entire transverse extent of said substrate. In other words, in all machine direction locations of cleaning card 200 a plurality of solid surfaces (as opposed to cuts) of discrete raised areas of 226 and 232 exist. In this preferred embodiment, there is no continuous machine-direction location occupied only by slits or cuts 240 joining the adjacent discrete raised areas 226 and 232 in each transverse row 238.

As is readily apparent from FIGS. 5 and 7, the peaks 228 and 234 of the discrete raised areas 226, 232, respectively, are provided by substantially sharp creases, and these creases are joined to substantially planar sections of the substrate 212 through a sloping peripheral wall including interrupted segments 230, 231 and a sloping peripheral wall including interrupted segments 236, 237, respectively.

It also should be noted that transverse end regions 242, 244 of the substrate 212 adjacent each of the opposed end edges 218, 220, respectively are substantially planar to provide a leading edge that easily can be inserted into a slot of a machine-actuating mechanism having internal surfaces to be cleaned. In other words, in the preferred cleaning card 200, either the end edge 218 or the end edge 220 can be employed easily as the leading edge for insertion into a slot of a machine-actuating mechanism to be cleaned.

In a representative embodiment, the cleaning card 200 has a transverse dimension of approximately 2½ inches, with the transverse dimension of each discrete raised area 226, 232 being approximately 0.285 inches wide. In addition, the discrete raised areas 226, 232 in adjacent transverse rows 238 are transversely offset from each other approximately 0.03 inches, to thereby stagger the orientation of the slits or slots 240 in the machine direction of feed of the card into the machine-actuating mechanism to be cleaned.

Figure 8:
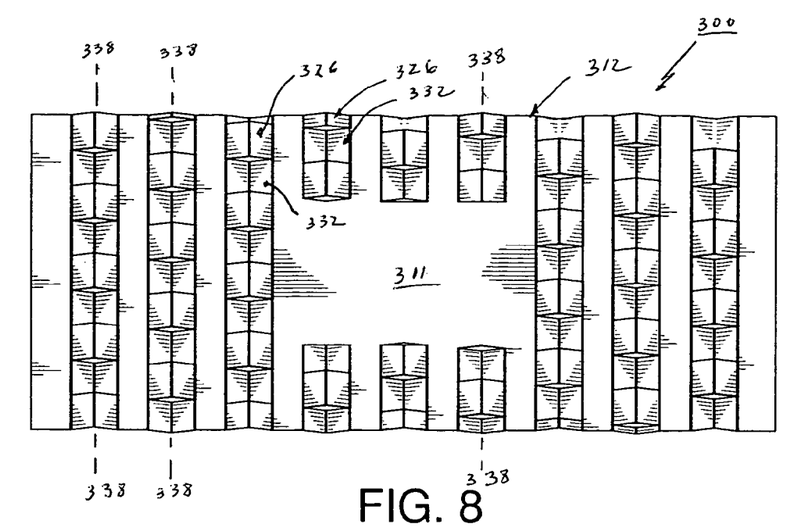
FIG. 8 is a plan view of yet another embodiment of the invention.

Referring to FIG. 8, an alternative embodiment of a cleaning card is illustrated at 300. This cleaning card is substantially identical to the cleaning card 200. That is, discrete raised areas 326, 332 in the cleaning card 300 are formed in the identical shape as the discrete raised areas 226, 232 in the cleaning card 200.

The only difference between the cleaning card 300 and the cleaning card 200 is that a central region 311 of the cleaning card 300 is provided by a substantially flat portion of the substrate 312 that is free of raised areas. This results from interrupting the transverse dimension of the three central transverse rows 338 of discrete raised areas.

For some applications it may be desirable to provide a substantially planar central region 311 to permit easy gripping of the cleaning card 300 by a suction pick-up device that commonly is employed in connection with automated pouching equipment, wherein one or more cleaning cards 300 is pre-packaged in a pouch. Such pouching equipment is well known to people skilled in the art and needs no further explanation herein.

Figure 9:
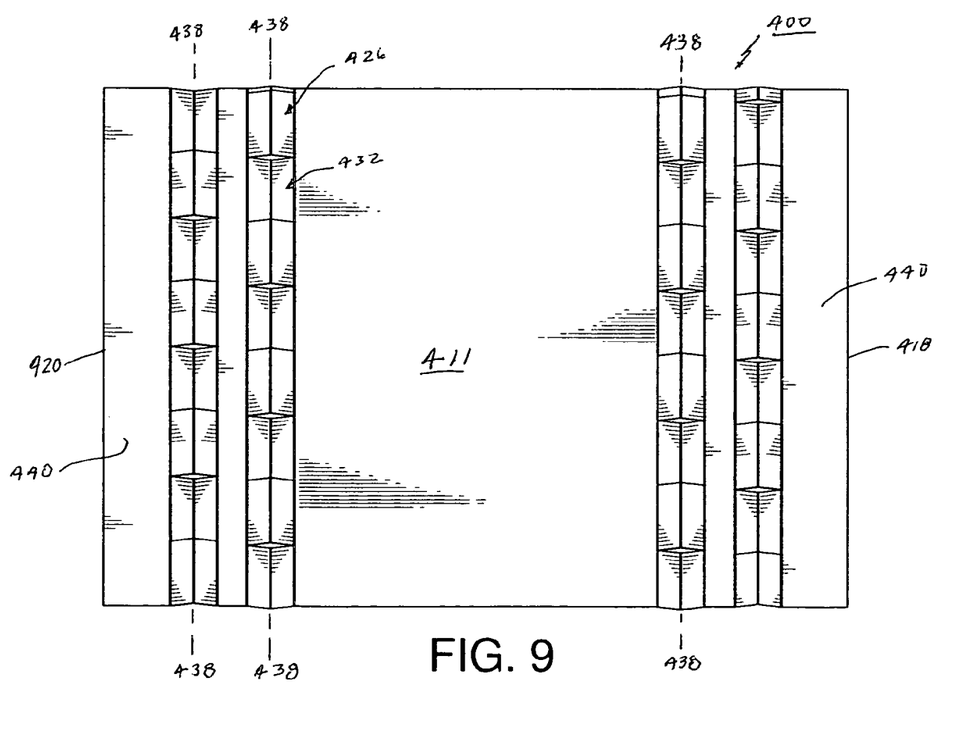
FIG. 9 is a plan view of yet another embodiment of the invention.

Referring to FIG. 9, yet another embodiment of a cleaning card is illustrated at 400. This cleaning card 400 is generally wider than the previously disclosed cleaning cards, but does include, in the preferred embodiment, the same structure of discrete raised areas 426, 432 as the discrete raised areas 226,232 employed in the cleaning card 200. In the illustrated embodiment, the discrete raised areas 426, 432 are provided in transversely extending, parallel rows 438. Two of the rows 438 are adjacent one end edge 418 of the cleaning card, and the other two rows 438 are adjacent the other end edge 420 of the cleaning card. Transverse regions 440 of the cleaning card 400 adjacent each of the end edges 418, 420 are substantially planar, to provide leading edges that can be directed into a machine-actuating mechanism to be cleaned.

The cleaning card 400 is well suited for use in cleaning thermal printers, which is a direct contact system in which a print head burns media into a paper. In the cleaning card 400, central section 411 is a substantially planar, unembossed region and is adapted to actually engage the print head and provide a burnishing function. In this structure, the cleaning card 10 is actually adapted to pick up dust both before and after the print gate of the thermal printer, by providing the central planar burnishing section 411 between the pairs of rows 438 of discrete raised areas disposed adjacent each end edge 418, 420 of the cleaning card.

It should be understood that the discrete raised areas 426, which extend on one side of the central line of the substrate also engage the print head to provide a burnishing function and the discrete raised areas 432 extending on the opposite side of the central plane also engage a print head disposed in contact with that side of the cleaning card.

Also, as in the earlier described embodiments, in the cleaning cards 300 and 400 the transverse rows 338, 438, respectively, can either be normal to the side edges of the cards, as illustrated, or can be canted at a different angle to said side edges, as desired.

Figure 10:
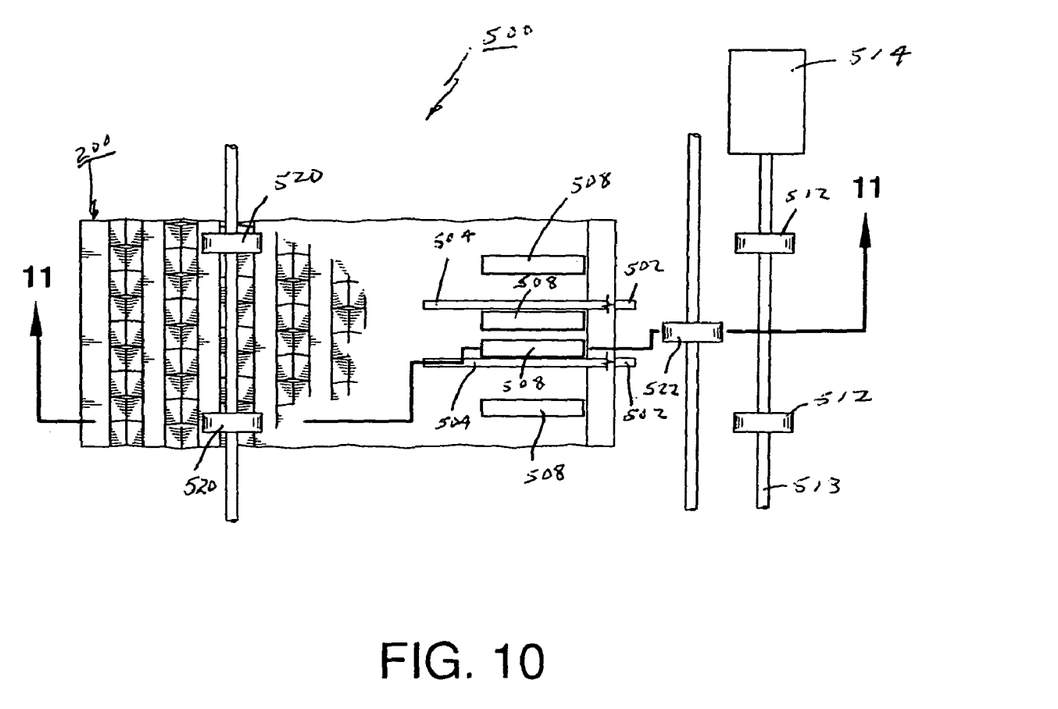
FIG. 10 is a schematic plan view of a portion of a machine-actuating mechanism of a type that can be cleaned with the cleaning cards of this invention, with parts omitted for purposes of clarity.
Figure 11:
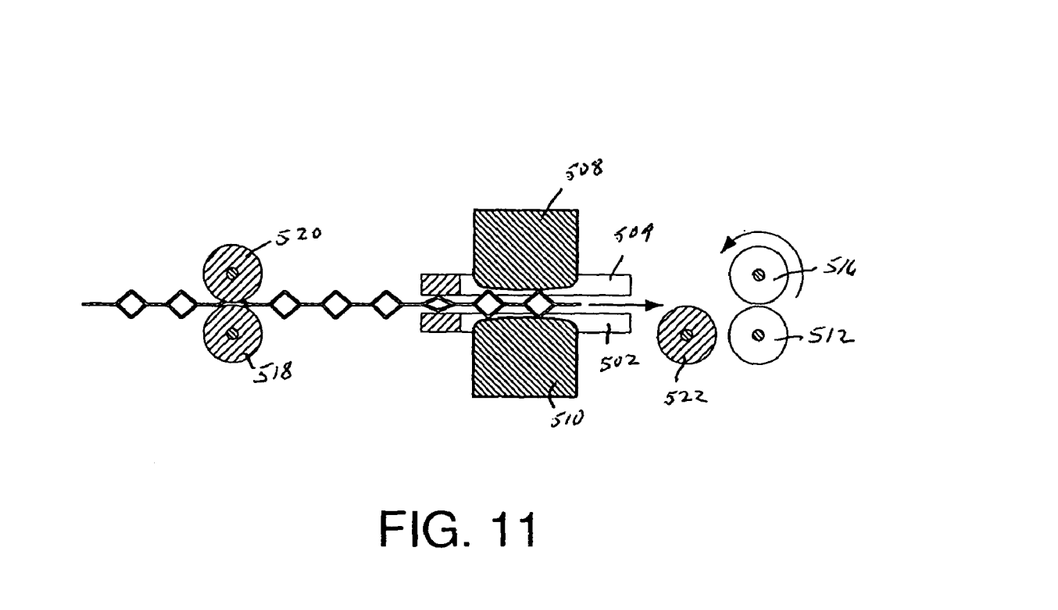
FIG. 11 is an end elevational view taken along line 11-11 of FIG. 10, also showing certain features that are omitted from FIG. 10.

The schematic representation illustrating a representative manner in which cleaning cards of this invention are employed is shown in FIGS. 10 and 11. It should be understood that the reading mechanism 500 that is illustrated in FIGS. 10 and 11 is by way of illustration only, and is not a limitation on the broadest aspects of this invention. However, it does constitute a machine-actuating mechanism in which the cleaning cards of this invention can desirably be employed.

Referring to FIGS. 10 and 11, a schematic representation of a machine-actuating mechanism 500 of a type that is capable of receiving either paper currency or a paper substrate with a bar code as the operating substrate will be described in connection with the use of cleaning card 200, which constitutes a preferred embodiment of this invention. In particular, the illustrated machine-actuating mechanism 500 includes transversely spaced apart lower rails 502 and vertically aligned, transversely spaced apart upper rails 504. The transverse spacing between the lower rails and between the upper rails is approximately $5/8^{th}$ inch. It should be noted that the upper and lower rails 504, 502 extend for a short distance beyond each end of reading heads 508, 510 to protect those heads, as will be explained in greater detail hereafter.

Referring to FIG. 10, the illustrated machine-actuating mechanism 500 includes four upper card reading heads 508; two disposed between the transversely spaced apart upper rails 504 and two located in a region outside of said rails. Four corresponding card readers, only one which is illustrated at 510 in FIG. 11, are vertically aligned with the four card readers 508 shown in FIG. 10.

Referring to FIG. 11, it should be noted that the upper card readers 508 are all recessed below inner peripheral surfaces of the upper guide rails 504 that define the upper guide path for the machine operating substrate (and also for the cleaning cards of this invention). In a like manner, the lower card readers 510 are recessed below the inner peripheral surfaces of the transversely spaced apart lower guard rails 502 that provide the lower support surface for the operating substrate or cleaning card of this invention. It should be apparent that if the cleaning cards employed to clean this mechanism were substantially planar, non-resilient members, they would pass through the feed slot between the upper and lower rails 504, 502 without engaging the exposed surfaces of the card readers or sensors requiring cleaning. This would preclude any effective cleaning of those exposed surfaces by the cleaning card.

As can be seen in FIGS. 10 and 11, the machine-actuating mechanism 500 includes a pair of transversely spaced apart, upper and lower drive rolls on each side of the card readers. Transversely spaced-apart lower rolls 512 located downstream of the reading heads each have an axial dimension of approximately ⅛ inch and are driven through a common drive shaft 513 from any suitable power source, e.g. motor 514. Referring to FIG. 10, each of these lower drive rolls 512 are in substantial alignment in the machine direction with the end reading heads 508, 510 located outside of the transverse area bounded by the pairs of upper and lower rails 504, 502, respectively.

A pair of upper, non-driven rolls (only one of which is shown at 516 in FIG. 11) are vertically aligned over the powered rolls 512 and are biased into meshing engagement with these powered rolls to aid in directing an operating card (and cleaning card of this invention) into and out of the machine-actuating mechanism 500.

Referring to FIGS. 10 and 11, a similar set of spaced-apart lower rolls 518 (only one of which is shown in FIG. 11) and spaced-apart upper rolls 520 are disposed at the upstream side of the guard rails 502, 504 and are similar to the drive rolls 512 and 516 described above. However, the upper, axial spaced apart drive rolls 520, as opposed to the lower spaced apart drive rolls 502, are the powered rolls.

As can be seen in FIG. 10, if desired a single, lower guide roll 522 can be provided in a location downstream of the guide rails but in longitudinal alignment with the gap between the transversely spaced apart guide rails 502, 504. This latter roll is not powered, and generally functions to aid in guiding the movement of the operating substrate and/or cleaning card into and out of the machine-actuating mechanism 500.

It should be understood that the materials that can be employed in the cleaning cards of this invention are all well known in the art and do not constitute a limitation on the broadest aspect of this invention. However, a preferred structure is a laminate including a flexible polymeric substrate, such as polypropylene substrate, provided with opposed, thin, non-woven layers that provide the desired cleaning function. Most preferably each of the non-woven layers is a spunlaced, non-woven material sold under the trademark Sontara by du Pont de Nemores and Company in Wilmington, Del. As noted, in this preferred construction the flexible substrate is the core and, although flexible, has the necessary rigidity to permit use of the substrate in a cleaning card structure.

The completed laminate, including the plastic core and spunlaced surface layers can be obtained from Bixby International, located in Newbury Port, Mass.

It should be understood that the unique features of this invention can be employed with cleaning card structures of a variety of different materials, which can easily be ascertained by individuals skilled in the art.

In accordance with a preferred method of this invention, applicants have discovered that by forming the discrete raised areas while the substrate employing the polymeric core is damp with a fluid, preferably water, the memory of the discrete raised areas for their formed configuration is materially enhanced. This enhanced memory results in an enhanced ability of the discrete raised areas to spring back to their preformed, raised condition after being compressed by internal surfaces in a machine-actuating mechanism to be cleaned. This enhanced ability to retain the deformed memory was unexpectedly discovered in connection with the formation of prototype cleaning cards 200 provided with the discrete raised areas 226, 232. Specifically, the cuts separating the discrete raised areas were formed with a waterjet that inherently also dampened the substrate. Applicants discovered that the discrete raised areas 226, 232 were easily formed in the dampened substrate and were set upon drying, with excellent memory for the deformed condition. In the preferred embodiment of the invention the substrate is permitted to dry under ambient conditions, it being unnecessary to provide a separate drying operation. However, if necessary, a separate drying step could be employed.

In accordance with a preferred method of this invention, the unembossed substrate is initially provided with sufficient moisture to render the substrate damp. Thereafter, the damp substrate is directed through a pair of embossing dies to form the desired, embossed pattern therein and then the substrate is permitted to dry under ambient conditions prior to packaging.

In accordance with another preferred method of this invention it has been discovered that with heated embossing dies the memory of the discrete raised areas for their formed configuration also is materially enhanced. This enhanced memory results in an enhanced ability of the discrete raised areas to spring back to their preformed, raised condition after being compressed by internal surfaces in a machine-actuating mechanism to be cleaned. In a representative embodiment, the discrete raised areas were embossed into the preferred cleaning card construction, which includes a polypropylene core, with embossing dies heated to approximately 70° C. The specific temperature of the heating dies does not constitute a limitation on the broadest aspects of this invention. The desired embossing die temperature will be dictated by the material of the cleaning card substrate and can be ascertained easily by individuals skilled in the art.

Applicants have determined that it is not possible to adequately retain the embossed configuration in the preferred substrate of this invention by embossing the substrate in a dry condition with unheated dies. However, by dampening the substrate prior to embossing, unheated dies can be effectively employed, or alternatively, heated dies can be employed without the need to dampen the substrate.

However, Applicants have determined that a combination of both dampening the substrate and employing heat during the embossing operation is preferred, since it gives more flexibility and control over the dwell time and pressure requirements during the manufacturing operation. This permits a faster production rate while establishing excellent memory for the embossed condition of the substrate. In this most preferred embodiment, the substrate is first dampened and then embossed with heated dies prior to permitting the substrate to dry under ambient conditions. If necessary a separate drying step may be provided.

In connection with forming the cleaning card 200, the set of embossing dies preferably are designed to provide the cutting or severing operation between adjacent raised areas simultaneously with the embossing of those raised areas into the substrate, and subsequent to dampening the substrate.

Although it is preferred to both form the raised areas and the cut areas in a single embossing operation, it also is possible (and within the scope of this invention) to initially provide cuts or slits in the substrates by a water jet cutting process as described above, prior to directing the substrate through an embossing station. This jet cutting process also functions to dampen the substrate prior to embossing, thereby permitting the substrate to retain the desired embossed configuration therein.

It should be understood that after forming the desired embossed pattern in the substrate the substrate is directed through a drying station to complete formation of the cleaning cards of this invention.

It should be noted that it is within the scope of this invention to specifically form the cleaning cards of this invention with the embossed pattern being determined, in part, by the specific reading mechanisms to be cleaned. Specifically, the location of various internal surfaces to be cleaned may dictate the arrangement and location of embossments in the cleaning cards in this invention.

Without further elaboration the foregoing will so fully illustrate our invention that others may, by applying current or future knowledge, readily adapt the same for use under various conditions of service.

What we claim as our invention is the following:

1. A cleaning card for use in cleaning internal surfaces of a machine-actuating mechanism of the type intended to receive an operating card or other machine-operating substrate for actuating the operation of a machine, said cleaning card including a substrate having a central plane between opposed surfaces thereof and having sufficient rigidity for use in the cleaning card, a machine direction dimension defined between opposed end edges and a transverse direction dimension defined between opposed side edges, said opposed surfaces each having a plurality of discrete raised areas providing a plurality of transversely extending rows of discrete raised areas for engaging and cleaning internal surfaces of the machine-actuating mechanism, adjacent, transversely extending rows of discrete raised areas being spaced apart from each other in the machine direction by substantially planar segments free of discrete raised areas, at least some discrete raised areas in at least some of the transversely extending rows extending outwardly on each side of said central plane, said discrete raised areas each including a peak and a sloping peripheral wall, said sloping peripheral wall having sloping sections sloping in opposite directions from opposed sides of said peak to substantially planar segments of said substrate that are spaced apart from the peak in the machine direction, adjacent sloping sections in adjacent transversely extending rows that are spaced apart in the machine direction by substantially planar segments are joined to said substantially planar segments, said peak of each raised area being intermediate said sloping sections of said raised area in the machine direction and being further from the central plane than the edge of each of said sloping sections joined to substantially planar segments, said cleaning card substrate having an effective thickness between the opposed surfaces that is greater than the nominal thickness between those surfaces.

2. The cleaning card of claim 1, wherein at least some of said discrete raised areas on each side of the central plane have an underlying recessed area.

3. The cleaning card of claim 1, the nominal thickness being substantially the same in transversely extending rows of discrete raised areas and in the planar segments between adjacent, transversely extending rows.

4. The cleaning card of claim 3, wherein at least some of said raised areas have a transverse dimension that is less than the transverse distance between transversely spaced-apart guard members of internal surface regions of a machine-actuating mechanism and a Z-direction dimension for engaging and cleaning said internal surface regions between said guard members, said guard members maintaining a machine-operating substrate out of engagement with said internal surface regions as part of the normal operation of said machine-actuating mechanism.

5. The cleaning card of claim 1, wherein said raised areas have a Z-direction dimension rendering said raised areas compressible by a feeding mechanism that directs the cleaning card into a machine-actuating mechanism having internal surfaces to be cleaned and are expandable upon release by said feeding mechanism.

6. The cleaning card of claim 1, wherein the nominal thickness of said cleaning card is less than the spacing of opposed internal surfaces of the machine-actuating mechanism to be cleaned and wherein the effective thickness of said cleaning card is at least as thick as the spacing of said opposed internal surfaces to be cleaned.

7. The cleaning card of claim 1, wherein the raised areas in each transversely extending row are transversely offset from the raised areas in adjacent transverse rows.

8. The cleaning card of claim 1, wherein at least some of said raised areas have a transverse dimension that is less than the transverse distance between transversely spaced-apart guard members of internal surface regions of a machine-actuating mechanism and a Z-direction dimension for engaging and cleaning said internal surface regions between said guard members, said guard members maintaining a machine-operating substrate out of engagement with said internal surface regions as part of the normal operation of said machine-actuating mechanism.

9. The cleaning card of claim 1 said discrete raised areas extending over substantially the entire area of said opposed surfaces.

10. The cleaning card of claim 1, wherein side margins of at least some of said raised areas extending in the machine direction are separated from said cleaning card substrate.

11. The cleaning card of claim 10, wherein said raised areas that are separated from said cleaning card substrate are separated by cuts.

12. The cleaning card of claim 11, wherein at least some of said raised areas have a transverse dimension that is less than the transverse distance between transversely spaced-apart guard members of internal surface regions of a machine-actuating mechanism and a Z-direction dimension for engaging and cleaning said internal surface regions between said guard members, said guard members maintaining a machine-operating substrate out of engagement with said internal surface regions as part of the normal operation of said machine-actuating mechanism.

13. The cleaning card of claim 10, wherein at least some of said raised areas have a transverse dimension that is less than the transverse distance between transversely spaced-apart guard members of internal surface regions of a machine-actuating mechanism and a Z-direction dimension for engaging and cleaning said internal surface regions between said guard members, said guard members maintaining a machine-operating substrate out of engagement with said internal surface regions as part of the normal operation of said machine-actuating mechanism.

14. The cleaning card of claim 1, wherein said discrete raised areas are disposed in at least two transversely extending rows located adjacent one of said opposed end edged and in at least two transversely extending rows that are located adjacent the other of said opposed end edges, said central region of said card being free of raised areas and having a continuous machine-direction dimension greater than the spacing between the at least two transversely extending rows of raised areas adjacent to each of the end edges.

15. The cleaning card of claim 14, wherein at least some of said raised areas include side margins extending in the machine direction and being separated from said cleaning card substrate.

16. The cleaning card of claim 15, wherein said raised areas that are separated from said cleaning card substrate are separated by cuts.

17. The cleaning card of claim 1, wherein said substrate is a laminate including outer layers for cleaning internal surfaces of the machine-actuating mechanism.

18. The cleaning card of claim 17, wherein said laminate includes an inner, polymeric substrate and outer non-woven layers on opposed sides of the polymeric substrate.

19. The cleaning card of claim 1, wherein every other raised area in each transverse row is on one side of the central plane and the other raised areas in each transverse row are on the other side of said central plane.

20. The cleaning card of claim 19, wherein at least some of said discrete raised areas on each side of said central plane have an underlying recessed area.

21. The cleaning card of claim 19, wherein side margins of at least some of said raised areas extending in the machine direction are separated from said cleaning card substrate.

22. The cleaning card of claim 21, wherein said raised areas that are separated from said cleaning card substrate are separated by cuts.

23. The cleaning card of claim 19, wherein the raised areas in each transversely extending row are transversely offset from the raised areas in adjacent transverse rows.

24. The cleaning card of claim 19, wherein at least some of said raised areas have a transverse dimension that is less than the transverse distance between transversely spaced-apart guard members of internal surface regions of a machine-actuating mechanism and a Z-direction dimension for engaging and cleaning said internal surface regions between said guard members, said guard members maintaining a machine-operating substrate out of engagement with said internal surface regions as part of the normal operation of said machine-actuating mechanism.

25. The cleaning card of claim 19, said discrete raised areas extending over substantially the entire area of said opposed surfaces.

26. The cleaning card of claim 1, wherein said effective thickness is more than three times the nominal thickness.

27. The cleaning card of claim 26, wherein at least some of said discrete raised areas on each side of said central plane have an underlying recessed area.

28. The cleaning card of claim 27, wherein at least some of said raised areas have a transverse dimension that is less than the transverse distance between transversely spaced-apart guard members of internal surface regions of a machine-actuating mechanism and a Z-direction dimension for engaging and cleaning said internal surface regions between said guard members, said guard members maintaining a machine-operating substrate out of engagement with said internal surface regions as part of the normal operation of said machine-actuating mechanism.

29. The cleaning card of claim 26, wherein side margins of at least some of said raised areas extending in the machine direction are separated from said cleaning card substrate.

30. The cleaning card of claim 29, wherein said raised areas that are separated from said cleaning card substrate are separated by cuts.

31. The cleaning card of claim 26, wherein the raised areas in each transversely extending row are transversely offset from the raised areas in adjacent transverse rows.

32. The cleaning card of claim 26, wherein at least some of said raised areas have a transverse dimension that is less than the transverse distance between transversely spaced-apart guard members of internal surface regions of a machine-actuating mechanism and a Z-direction dimension for engaging and cleaning said internal surface regions between said guard members, said guard members maintaining a machine-operating substrate out of engagement with said internal surface regions as part of the normal operation of said machine-actuating mechanism.

* * * * *